United States Patent

Egara et al.

[11] Patent Number: 5,962,950
[45] Date of Patent: Oct. 5, 1999

[54] COMPACT SURFACE ACOUSTIC WAVE APPARATUS, SPREAD SPECTRUM SIGNAL RECEIVER USING THE SAME APPARATUS FOR RECEPTION OF SPREAD SPECTRUM SIGNAL, AND SPREAD SPECTRUM SIGNAL COMMUNICATION SYSTEM USING THE SAME SPREAD SPECTRUM SIGNAL RECEIVER

[75] Inventors: Koichi Egara, Tokyo; Akira Torisawa, Machida; Tadashi Eguchi, Kawasaki; Akihiro Koyama, Yokohama; Takahiro Hachisu, Yokohama; Akane Yokota, Yokohama, all of Japan

[73] Assignee: Canon Kabushiki Kaisha, Tokyo, Japan

[21] Appl. No.: 08/630,779

[22] Filed: Apr. 10, 1996

[30] Foreign Application Priority Data

Apr. 10, 1995 [JP] Japan .................................. 7-084105

[51] Int. Cl.$^6$ ................................................. H01L 41/08
[52] U.S. Cl. .................................. 310/313 R; 310/313 D; 310/344; 364/821
[58] Field of Search .......................... 310/313 R, 313 D, 310/344; 73/193–196, 150–153; 364/821

[56] References Cited

U.S. PATENT DOCUMENTS

| | | | |
|---|---|---|---|
| 4,410,824 | 10/1983 | Steinberg | 310/313 R |
| 4,448,805 | 5/1984 | Lewis | 310/313 R X |
| 4,737,742 | 4/1988 | Takoshima et al. | 310/313 R X |
| 5,281,883 | 1/1994 | Ikata et al. | 310/313 R |
| 5,459,368 | 10/1995 | Onishi et al. | 310/313 R |
| 5,699,027 | 12/1997 | Tsuji et al. | 333/193 |

FOREIGN PATENT DOCUMENTS

| | | | |
|---|---|---|---|
| 0020615 | 2/1985 | Japan | 310/313 R |
| 1-273390 | 11/1989 | Japan . | |
| 5275965 | 10/1993 | Japan | 310/313 R |
| 6053775 | 2/1994 | Japan | 310/313 R |
| 6085600 | 3/1994 | Japan | 310/313 R |
| 6132770 | 5/1994 | Japan | 310/313 R |

OTHER PUBLICATIONS

Shibayama, "Applications of Surface Acoustic Wave," Television 30, pp. 457–463 (1976).

*Primary Examiner*—Mark O. Budd
*Attorney, Agent, or Firm*—Fitzpatrick Cella Harper & Scinto

[57] ABSTRACT

In a surface acoustic wave apparatus, a surface acoustic wave element for obtaining a convolution signal is housed in a recess of a substrate. Since the surface acoustic wave element is housed in the recess of the substrate in this surface acoustic wave apparatus, the apparatus can be compactified. This effect of compactification is remarkable, because the surface acoustic wave element has an output electrode for obtaining the convolution signal and thus originally has a big element size. When a laminate substrate is used as the substrate, a configuration for effectively using surfaces of respective layers may be arranged in such a manner that output wiring of the convolution signal is separately formed in the layers. This further enhances the effect of compactification. There are further disclosed a spread spectrum signal receiver using the above surface acoustic wave apparatus for receiving a spread spectrum signal, and a spread spectrum communication system using the spread spectrum signal receiver.

15 Claims, 7 Drawing Sheets

COMPACT SURFACE ACOUSTIC WAVE APPARATUS, SPREAD SPECTRUM SIGNAL RECEIVER USING THE SAME APPARATUS FOR RECEPTION OF SPREAD SPECTRUM SIGNAL, AND SPREAD SPECTRUM SIGNAL COMMUNICATION SYSTEM USING THE SAME SPREAD SPECTRUM SIGNAL RECEIVER

BACKGROUND OF THE INVENTION

1. Field of the Invention

The present invention relates to a surface acoustic wave apparatus for extracting a convolution signal of two surface acoustic wave signals, utilizing the physical nonlinear effect, and to a spread spectrum signal receiver and a communication system using it.

2. Related Background Art

Surface acoustic wave convolvers for extracting a convolution signal of two surface acoustic wave signals are increasing its significance as a key device in performing spread spectrum communication these years and are actively being researched.

FIG. 1 is a schematic drawing to show a conventional surface acoustic wave convolver device. In the drawing, numeral 111 designates a piezo-electric substrate of Y-cut (Z-propagation) lithium niobate or the like, and numerals 112, 113 interdigital input electrodes formed on the surface of the piezo-electric substrate 111. Numeral 114 denotes an output electrode formed on the surface of the piezo-electric substrate 111.

When high-frequency signals of angular frequency $\omega$ are input into the interdigital input electrodes or transducers (IDTs) 112, 113 in the surface acoustic wave convolver device, the two signals propagate on the surface and inside the piezo-electric substrate to be confined in the output electrode 114 and, for example by the nonlinear effect of the piezo-electric substrate, a signal of angular frequency $2\omega$ can be obtained from an output pad of the output electrode 114.

These electrodes are made of a conductive material such as aluminum, and are formed directly on the surface of the piezo-electric substrate 111 normally by the photolithography technology. This mechanism of convolution is described in detail, for example, in Shibayama, "Applications of surface acoustic wave," Television, 30, 457 (1976). The surface acoustic wave convolver device is mounted on a metal or ceramic package base with a space secured above a propagation path of surface acoustic wave and, after bonding with wires, the package is airtightly sealed by a metal cap in order to assure reliability.

The package housing the surface acoustic wave device is placed together with convolver peripheral circuits including a convolver input-output matching circuit etc., and spread spectrum communication transmission-reception circuits on a printed-wiring board of glass/epoxy or the like, and the resultant is applied to surface acoustic wave convolver apparatus or spread spectrum communication apparatus.

However, because the conventional surface acoustic wave convolver device needs to be airtightly sealed as housed in the metal or ceramic package, there are disadvantages that the package size becomes larger and that the cost becomes higher.

Particularly, the element length of the surface acoustic wave convolver device is longer than those of the other surface acoustic wave devices such as a filter in which an output electrode is positioned as opposed to an input electrode, because the long output electrode exists as opposed to each of the input electrodes at the both ends.

Further, if a convolver with a large signal processing time length is needed, the element length becomes longer in proportion to the signal processing time length and a package larger by that degree becomes necessary, which would result in disadvantages of increasing the size and the cost of the entire surface acoustic wave apparatus.

If output signals are taken out from plural positions on the output electrode of convolver, it is necessary to form a tournament-shaped output synthesis pattern in the package or on the printed-wiring board, which would result in a disadvantage that the size of the spread spectrum communication apparatus including the package and the printed-wiring board becomes larger.

A conventionally known technique for sealing the surface acoustic wave filter is the technique in which a recess is formed in a multilayer wiring substrate and the surface acoustic wave filter is housed in the recess to be sealed therein, as disclosed in Japanese Laid-open Patent Application No. 1-273390. The present invention is the one having been achieved by applying the above technique to the convolver devices inherently involving the problem that the element length becomes longer than those of ordinary surface acoustic wave filters.

An object of the present invention is to provide a surface acoustic wave apparatus using a convolver device, a spread spectrum communication apparatus, and a system using it, as decreasing the size and the cost of the surface acoustic wave apparatus associated with the package for convolver device and decreasing the size and cost of the spread spectrum communication apparatus using it.

A further object of the present invention is to decrease the size and cost of the surface acoustic wave apparatus for extracting convolution signals from plural positions of the output electrode in order to take a convolution output out from convolver without a phase difference.

SUMMARY OF THE INVENTION

The above objects can be achieved by the following surface acoustic wave apparatus.

A surface acoustic wave apparatus comprising:
a surface acoustic wave element comprising;
a first substrate having a piezo-electric property;
an input electrode, disposed on a first principal plane of said substrate, for exciting first and second surface acoustic waves;
an output electrode for taking a convolution signal of said first and second surface acoustic waves out by nonlinear effect; and
a second substrate for housing said surface acoustic wave element;
wherein said surface acoustic wave element is housed in a recess formed in said second substrate.

The surface acoustic wave apparatus can be compactified because the surface acoustic wave element is housed in the recess of the second substrate. This effect of compactification is outstanding because the surface acoustic wave element has the output electrode for obtaining the convolution signal and the element size is originally big. A ceramic material or a resin material may be used for the second substrate. A laminate substrate composed of plural layers can be used as the second substrate. Use of the laminate substrate permits wiring including output wiring of convolution signal etc. to be formed as distributed to the plural layers.

The present invention may take such structure that the convolution signal is taken out of a plurality of portions of the output electrode and a tournament-shaped strip pattern, comprised of a conductive thin film and having a plurality of input terminals to which signals from the plurality of take-out portions are input, is formed on a surface of at least one layer of the laminate substrate.

When the second substrate is the laminate substrate, the substrate can be formed in such structure that a part of output wiring, made of a conductive substance, for taking the convolution signal out is formed in each of at least two layers of the laminate substrate and interlayer connection wiring is formed to connect the parts of output wires formed in the at least two layers with each other, which can effectively utilize the surface space of each layer. The interlayer output wiring can take such structure that it is formed in a hole formed through some layers. In this structure, the convolution signal is taken out from the plural take-out portions of the output electrode, the output wiring is the tournament-shaped wiring with the plural input terminals for receiving the signals from the plural take-out portions, and the interlayer connection wiring is formed as a part of the tournament-shaped wiring, whereby the tournament-shaped wiring can be formed as effectively using the surface space of each layer and whereby the size of the apparatus including the wiring can be particularly compactified because the interlayer connection wiring can be formed as a part of the tournament-shaped wiring.

The plural take-out portions of the output electrode and the plural input terminals of the tournament-shaped wiring (tournament-shaped strip pattern) are arranged at nearly equal intervals along the longitudinal direction of the output electrode, which permits such structure that the take-out portions and the input terminals corresponding to each other are connected by electrical connection means. This electric connection means may be wire bonding or may take the structure using bumps in which the output electrode of the surface acoustic wave element is formed in a face-down arrangement where the plural take-out portions face the plural input terminals.

It is preferable to set the tournament-shaped wiring (tournament-shaped strip pattern) and the electrical connection means between the plural input terminals of the tournament-shaped wiring (tournament-shaped strip pattern) and the plural take-out portions so as to make nearly equal to each other arrival times of signals from the plural take-out portions of the output electrode at an output terminal of the tournament-shaped wiring (tournament-shaped strip pattern). Specifically, it can be realized by such an arrangement that lengths of paths of signals from the plural take-out portions of the output electrode at an output terminal of the tournament-shaped wiring (tournament-shaped strip pattern) can be nearly equal to each other.

It is also possible to take the structure in which a convolver peripheral circuit is formed on the second substrate and the convolver peripheral circuit includes at least one of a convolver input-output matching circuit, a filter, and an amplifier. It is also possible to take the structure in which a spread spectrum signal receiving circuit is formed on the second substrate and the spread spectrum signal receiving circuit includes at least one of an RF signal processing unit, a reference signal generating unit, and a convolution output signal processing unit. When the second substrate is the laminate substrate, the convolver peripheral circuit and/or the spread spectrum signal receiving circuit can be formed not only on the surface of the laminate substrate, but also between layers laminated.

The present application also discloses a spread spectrum signal receiver using the above-described surface acoustic wave apparatus in order to obtain a convolution signal of a spread spectrum signal and a reference signal, and a spread spectrum communication system using the spread spectrum signal receiver.

DESCRIPTION OF THE PREFERRED EMBODIMENTS

Figure 1:
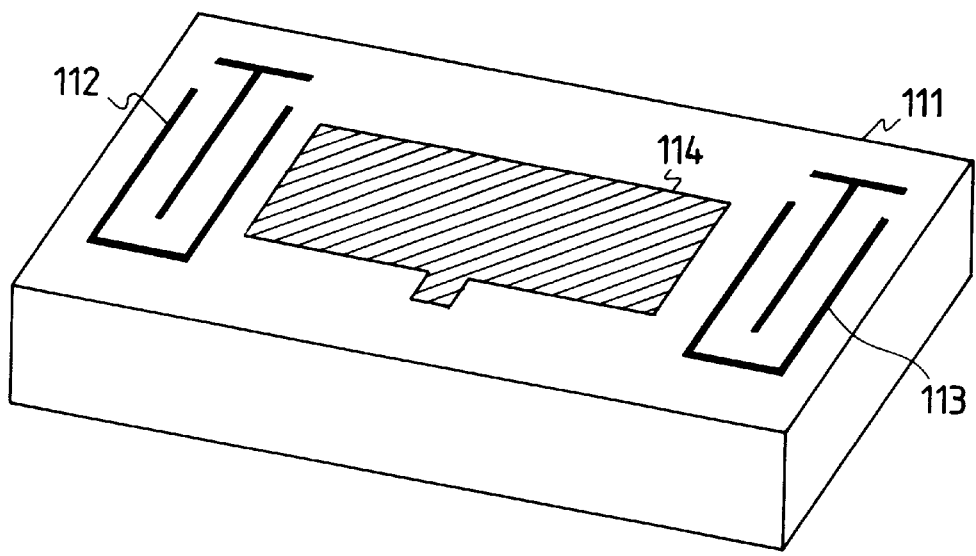
FIG. 1 is a structural drawing of the conventionally known convolver device.
Figure 2:
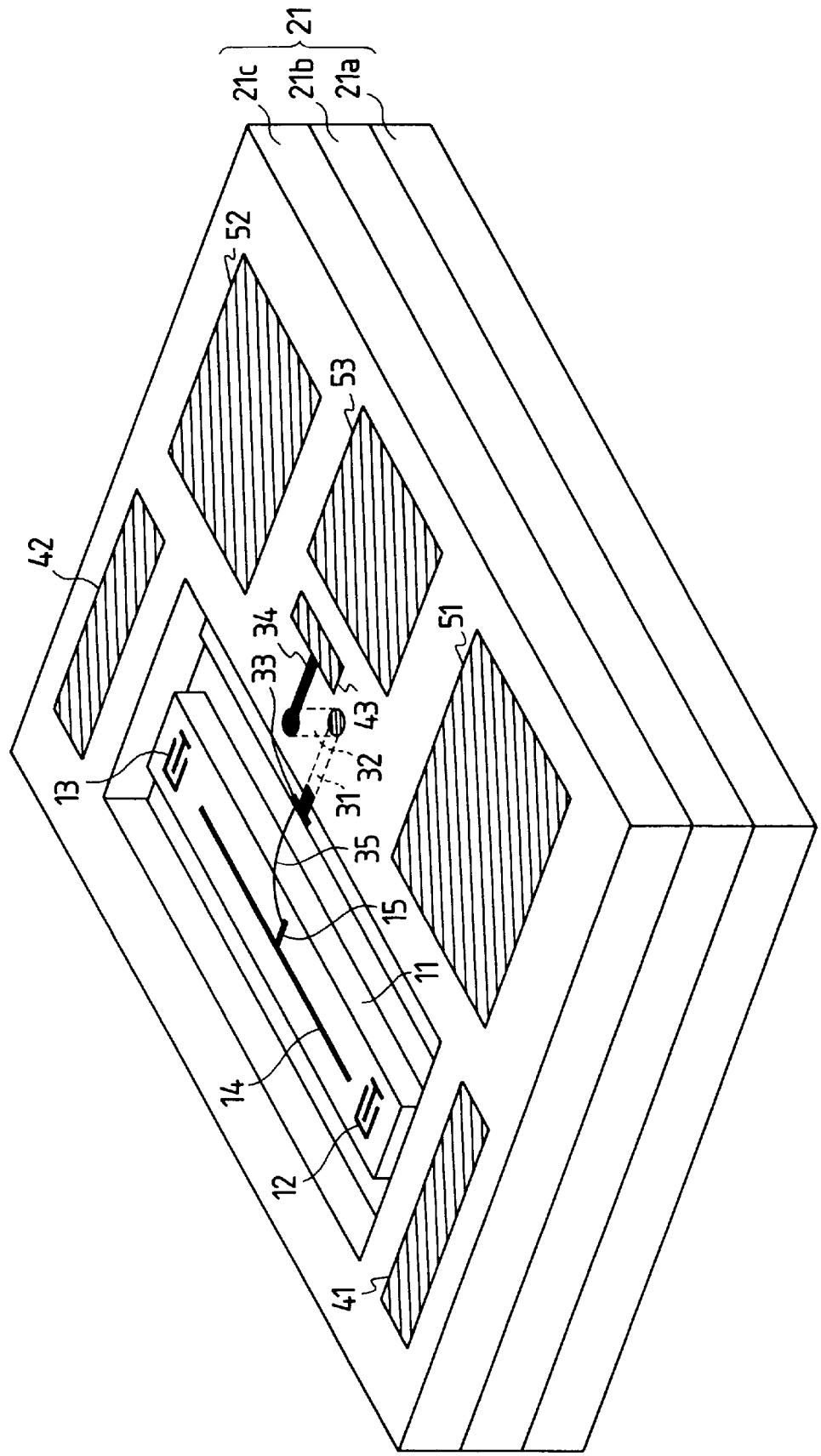
FIG. 2 is a structural drawing of the first embodiment of the surface acoustic wave apparatus of the present invention.
Figure 3:
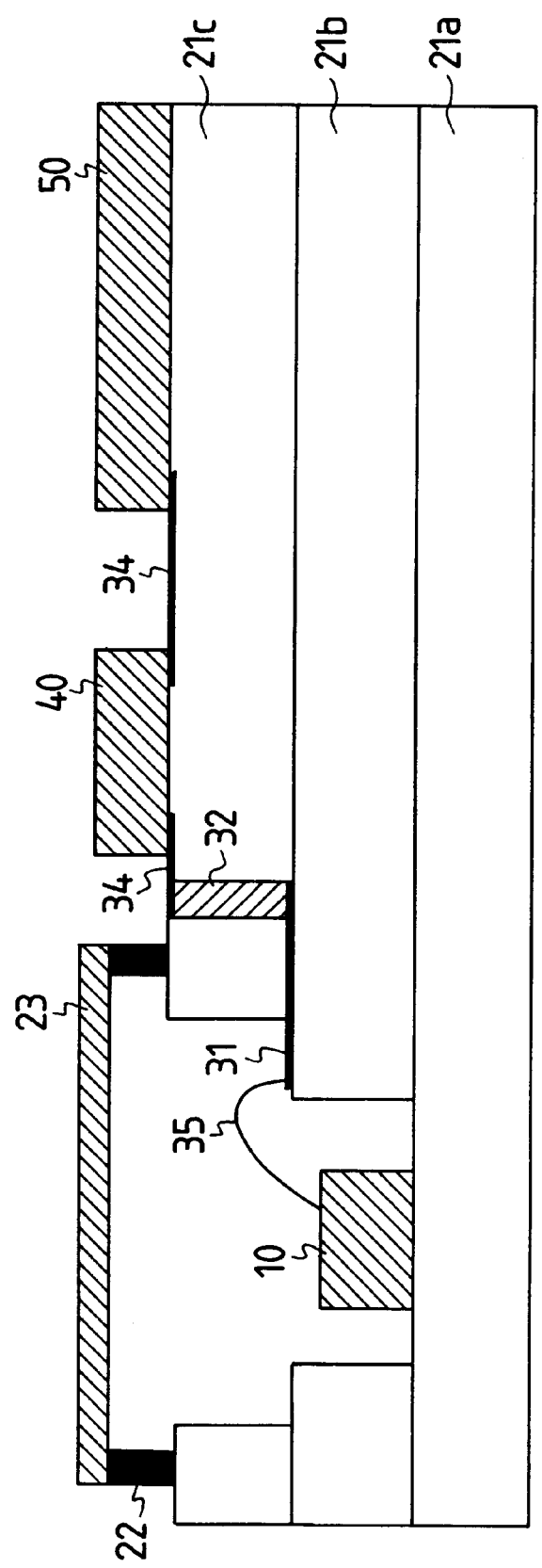
FIG. 3 is a cross-sectional view in the transverse direction of the surface acoustic wave apparatus shown in FIG. 2.

The embodiments according to the present invention will be explained with reference to the drawings.
[First Embodiment]
FIG. 2 is a schematic drawing to show the first embodiment of the surface acoustic wave apparatus according to the present invention, and FIG. 3 is a cross-sectional view to show a transverse cross section of FIG. 2.

In the drawing, reference numeral 10 designates a surface acoustic wave convolver device, 11 a piezo-electric substrate of Y-cut (Z-propagation) lithium niobate or the like, 12, 13 interdigital input electrodes formed on the surface of the piezo-electric substrate 11, and 14 an output electrode formed on the surface of the piezo-electric substrate 11. Numeral 15 denotes a pad for bonding provided in the central portion of the output electrode 14. These electrodes (IDTs) 12–15 are made of a conductive material such as aluminum, and are formed directly on the surface of the piezo-electric substrate 11, normally using the photolithography technology.

Numeral 21 is a laminate printed-wiring substrate composed of three layered ceramic substrates, and 21a to 21c are the ceramic sheet substrates forming the laminate printed-wiring substrate 21, wherein 21a the ceramic sheet of the first layer on which the surface acoustic wave convolver device 10 is mounted, 21b the ceramic sheet of the second layer on which a part of the strip pattern is formed, and 21c the ceramic sheet of the third layer on which a part of the strip pattern is formed. Further, numeral 22 denotes a seam ring formed on the ceramic sheet of the third layer, 23 a cap made of a metal such as Kovar (29Ni-18Co-Fe) or 42 alloy (22, 23 are not illustrated in FIG. 2), 31 a strip pattern formed of a conductive material on the ceramic sheet 21b, 32 a via hole in which the inside of the through hole is made of a conductive material so as to electrically connect the strip pattern 31 on the second layer ceramic sheet 21b with a strip pattern 34 on the third layer ceramic sheet 21c, 33 a strip pattern input pad formed in connection with the end of the strip pattern 31 on the surface acoustic wave device side or formed using a part of the end portion, 34 a strip output terminal formed on the convolver peripheral circuit side of the strip pattern 31, and 35 a bonding wire for connecting the bonding pad 15 of the output electrode 14 with the strip input terminal pad 33.

Numeral 40 designates a convolver peripheral circuit placed on the ceramic substrate 21, 41 a receiving-signal-side convolver peripheral circuit, 42 a reference-signal-side convolver peripheral circuit, and 43 a convolver peripheral circuit portion for output signal. Each of the receiving-signal-side convolver peripheral circuit 41, the reference-signal-side convolver peripheral circuit 42, and the convolver peripheral circuit portion for output signal 43 is composed of a matching circuit for matching of input and output impedances, a filter for filtering a specific frequency signal, and an amplifier for amplifying a signal to a predetermined signal level.

Further, numeral 50 is a spread spectrum signal receiving circuit, 51 a high-frequency signal processing unit for spread spectrum communication placed on the three-layered ceramic substrate 21, 52 a reference signal generating unit for spread spectrum communication placed on the third layer ceramic substrate 21, and 53 a convolver output signal processing unit for spread spectrum communication placed on the three-layered ceramic substrate 21.

In the surface acoustic wave apparatus and spread spectrum signal receiving apparatus of this structure, the convolver device 10 is housed in a recess formed in a part of the laminate printed-wiring substrate, comprised of the third layer ceramic sheet 21c. Namely, the convolver device 10 is mounted on the ceramic substrate sheet 21a of the first layer, and the ceramic substrate sheets of the second layer and the third layer around it are bored to form a recess in a stepped shape from the first layer to the third layer of the ceramic sheets.

Here, the convolver peripheral circuits 41 to 43 are formed on the ceramic substrate 21 of the three layers in the peripheral region of the recess housing the convolver device 10.

In order to input a receiving signal and a reference signal from the high-frequency signal processing unit for spread spectrum communication 51 and the reference signal generating unit 52 into the two input IDTs 12, 13 of the convolver device, the signals from the receiving-signal-side convolver peripheral circuit 41 and the reference-signal-side convolver peripheral circuit 42 formed on the surface of the third layer ceramic sheet 21c are input into the two interdigital input electrodes 12, 13 through via holes 32, formed through the third layer ceramic sheet 21c up to the surface of the second layer ceramic sheet 21b, and strip patterns 31 formed on the second layer ceramic sheet 21b, and then through strip input pads 33 and bonding wires 35 (not shown).

The convolution output signal is input to the peripheral circuit 43 formed on the surface of the third layer ceramic sheet 21c through the strip pattern 31 formed on the second layer ceramic sheet 21b, the output electrode pad 15, the bonding wire 35, and the via hole 32, formed through the third layer ceramic sheet 21c up to the surface of the third layer ceramic sheet 21c, and the output is connected to the convolver output signal processing circuit for spread spectrum communication 53.

The seam ring 22 is placed on the three-layered ceramic substrate 21 around the bored portion, and the cap 23 is welded to hermetically seal the inside in an inert atmosphere such as nitrogen by a welder or the like such as a seam sealer for seam-welding as pressing the cap against the seam ring 22 and supplying the current to the seam ring 22.

As explained, the structure according to the present invention does not need an extra package for convolver because the convolver device 10 is housed in the ceramic laminate substrate, in which the convolver peripheral circuits and the transmitting/receiving circuits for spread spectrum communication are formed, and it is airtightly sealed therein. It is thus possible to decrease the size and the cost of the entire apparatus.

Of course, the layers of the three-layered ceramic substrate 21 are press-bonded to each other so as to have adhesion, and adhesion is strong between the third layer ceramic sheet 21c and the seam ring 22. Thus, airtightness can be maintained permanently, which is effective to maintain the performance of the convolver 10.

[Second Embodiment]

Figure 4:
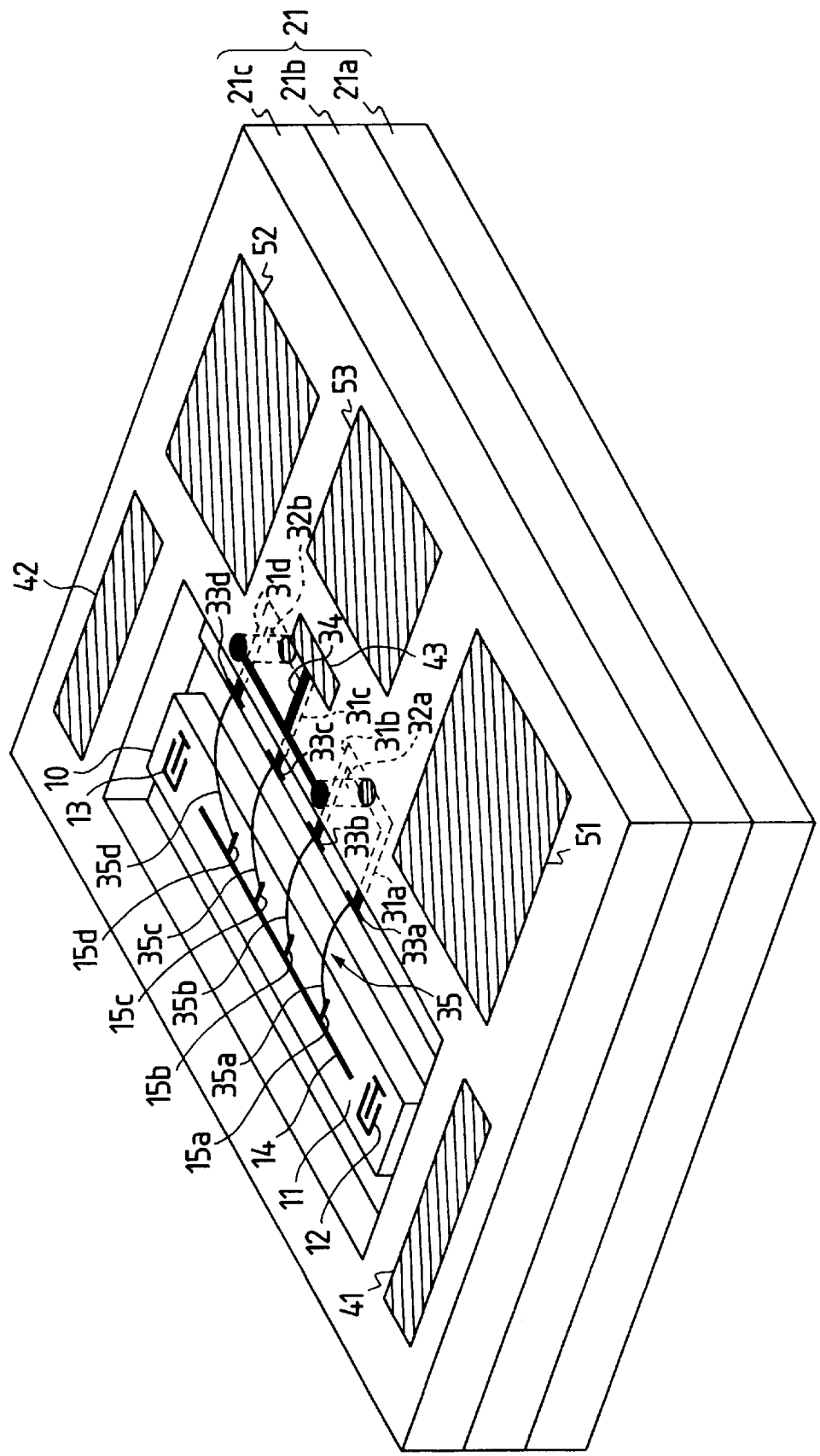
FIG. 4 is a structural drawing to show the second embodiment of the surface acoustic wave apparatus of the present invention.

FIG. 4 is a schematic drawing to show the second embodiment of the surface acoustic wave apparatus according to the present invention. In the drawing, the same members as those in FIG. 2 described above are denoted by the same reference numerals. The present embodiment is different from the first embodiment in that the convolution output is taken out of plural portions of the output electrode 14 of the convolver device and output signals are combined into one through approximately tournament-shaped strip patterns and/or via holes formed in the laminate substrate 20. The "tournament shape" is a configuration for obtaining one output by synthesizing plural inputs, and is a combination of multiple approximately U-shaped wiring patterns each for synthesizing two inputs (only one wiring pattern is used in the case of only two inputs).

In FIG. 4, 15a to 15d are output electrode pads for bonding provided at nearly equal intervals in the longitudinal direction of the output electrode and at plural portions of the output electrode 14. The number and intervals of the output electrode pads are determined taking it into consideration that the signal generated on the output electrode can be taken out without influence of phase difference. Symbols 31a to 31d denote strip patterns formed of a conductive material on the ceramic sheet 21b, 32a, 32b via holes made of a conductive material for electrically connecting the strip patterns 31a–31d on the second layer ceramic sheet 21b with a strip pattern 34 on the third layer ceramic sheet 21c, 33a to 33d strip input pads formed in connection with the surface-acousticwave-device-side ends of the strip patterns 31a to 31d or using parts of the end portions, 34 a strip output terminal formed on the convolver peripheral circuit side of the strip patterns 31a–31d, and 35a–35d bonding wires each for connecting the bonding pads 15a–15d with the corresponding strip input terminal pads 33a–33d.

Here, the convolver peripheral circuits 41–43 are formed on the three-layered ceramic substrate 21 and in the peripheral region of the recess housing the convolver device 10.

Further, strip patterns 31a–31d and strip input pads 33 for transmitting the signals from the high-frequency signal processing unit 51 and reference signal generator 52 to the two input IDTs 12, 13 of the convolver device are formed on the second layer ceramic sheet 21b, and via holes 32 are formed through the third layer ceramic sheet 21c up to the surface of the third layer ceramic sheet 21c.

The first-step strip patterns 31a, 31b connected in the same U-shape with the strip input pads 33a and 33b, 33c and 33d are formed on the second layer ceramic sheet 21b, and the via holes 32a, 32b are formed through the third layer ceramic sheet 21c approximately from the middle point of each U-shaped pattern 31a, 31b up to the surface of the third layer ceramic sheet 21c.

Formed on the surface of the third layer ceramic sheet 21c is the second-step strip pattern 31c of a T-shape connecting the via holes 32a, 32b and projecting nearly from the central portion to the opposite side to the mount side of the surface acoustic wave device, which is connected to an output terminal 34 for leading the output signal out of the package.

Accordingly, the above structure achieves the so-called tournament-shaped pattern in which all path lengths are the same between the strip input pads 33a, 33b and the output terminal 34 and in which all arrival times of signals thereat are the same.

The strip input pads 33a–33d are provided at nearly equal intervals, similarly as the output electrode pads 15a–15d, in the longitudinal direction of the output electrode 14, and the bonding wires 35a–35d are formed all in an approximately same length.

Here, it is desirable that each bonding wire 31a–31d bridging between the corresponding output electrode pad 15a–15d and strip input terminal be as short as possible.

The present embodiment showed the example in which the number of plural output take-out portions of the output electrode 14 was four, but the number may be arbitrarily determined; for example, desirably and usually, a number expressed by the n-th power of 2, i.e., 2, 4, 8, 16, . . .

The convolver device 10 is fixed on the ceramic sheet 21a, the seam ring is placed on the three-layered ceramic substrate 21 and around the bored portion of the ceramic sheets 21b, 21c, similarly as in the first embodiment, and the cap is welded in an inert atmosphere such as nitrogen by a welder or the like such as a seam sealer for seam-welding the cap to the seam ring as pressing and supplying the current thereto, whereby the convolver 10, bonding wires 35, etc. are airtightly sealed therein.

As explained, the structure according to the present invention does not need an extra package for convolver, either, because the convolver is housed in the ceramic laminate substrate, in which the convolver peripheral circuits and communication circuits are formed, and it is airtightly sealed therein. It can decrease the size and the cost of the entire apparatus. Further, composite incorporation of the convolver and peripheral circuits permits a high-reliability surface acoustic wave apparatus to be produced.

In the above embodiment the approximately tournament pattern was three-dimensionally formed on the two layers of ceramic sheets 21b and 21c, using the strip patterns and via holes, but the tournament pattern may be flatly formed with the strip patterns on a certain specific layer of the laminate sheet so that the line lengths between the output electrode pads 15a–15d and the output terminal 34 may be the same.

[Third Embodiment]

The above first and second embodiments showed the examples in which the spread spectrum communication receiving portion using the convolver comprised of the convolver peripheral circuits, high-frequency signal processing unit, reference signal generating unit, and convolution signal processing unit was formed on the ceramic laminate substrate housing the convolver device, but it may be constructed of only a part thereof or a different circuit configuration may be employed. Further, the arrangement of the circuits etc., the space size, and so on are not limited to those shown in the embodiments, but may be determined arbitrarily. The wiring connection structure, the connection structure of each circuit, and so on on the input electrode side were omitted in the drawing, but they are not limited thereto in the present embodiment.

The above first and second embodiments employed bonding by the wire bonding, but another embodiment may employ face-down bonding using bumps. The above first and second embodiments were arranged in such a manner that the bonding pad was formed on the output electrode, but bonding may be directly done onto the output electrode.

The above first and second embodiments showed the examples in which the strip input pad for bonding was juxtaposed to the strip pattern, but bonding may be directly done to the strip pattern, depending upon the line width of the strip pattern. Further, the above first and second embodiments showed the examples of the packages in which the three layers of ceramic sheets were laminated, but the laminate may be composed of layers more than three or of a single layer.

The above first and second embodiments showed the examples in which the ceramic was used as a material for the laminate printed-wiring substrate, but the material may be a resin or other material that can keep the airtightness of the space for sealing the surface acoustic wave device. In the above first and second embodiments, the width of the strip pattern 31 and the size of the via hole 32 may be arbitrarily determined each in the range effective to matching of desired characteristic impedance or the like, and are not limited to the ranges of the invention shown in the explanatory drawings of the embodiments. In the above first and second embodiments, the width of the strip pattern 31 and the material for the via hole 32 may be determined arbitrarily.

The above embodiments showed the examples in which the peripheral circuits of the convolver were formed on the third-layer ceramic sheet, but they may be formed between the laminate sheets. The above embodiments showed the examples in which only the strip patterns and via holes for input and output signals of convolver were formed on the package, but a pattern for signal, a pattern for ground, etc. may be formed in addition thereto.

The above embodiments showed the examples using the normalized IDTs as the input metal electrodes, but other IDTs, for example arcuate, apodization type, or chirp type IDTs, may be used. In the above embodiments, a condensing means such as a parabolic horn type waveguide or a multi-strip coupler may be provided as a condensing means of surface acoustic waves between the input electrodes and the output electrode.

In the above embodiments, the substrate 11 is not limited to the piezo-electric single crystal such as lithium niobate, but any material and structure having the parametric mixing effect can be employed, for example a semiconductor or a structure in which a piezo-electric film is added onto a glass substrate.

Further, in the above embodiments, if the interdigital input electrodes 12, 13 are formed as double electrodes (split electrodes), reflection of surface acoustic waves can be suppressed at the input electrodes, whereby the characteristic of device can be further improved.

The above embodiments showed the examples in which the present surface acoustic wave apparatus, particularly the convolver as an application thereof, was applied to the spread spectrum communication method, but the present surface acoustic wave apparatus may be buried or sealed as a delay line, a filter, a signal processing circuit, an elastic wave guide, an optical device, an oscillator device, or a resonator device in a multi-layer or single-layer printed-wiring substrate. Further, the surface acoustic wave apparatus according to the present invention, which is compact in size, low in assembling man-hours, thus high in reliability, and low in cost, can be used not only in the communication field, but also in the information processing field.

As described above, the present invention can realize the packageless arrangement for the spread spectrum communication apparatus using the surface acoustic wave convolver by using the printed-wiring substrate of multiple layers, forming a recess in the laminate substrate, and setting the convolver device therein, and can also realize decreases of the size and the cost of the surface acoustic wave apparatus, the spread spectrum signal receiver, and the system using it.

When the surface acoustic wave apparatus of the present invention is used in a receiver in the system for performing the spread spectrum communication, the receiver may be realized in compact size, with high reliability, and at low cost, and the system can also be attained with high reliability and at low cost.

[Embodiment 4]

Figure 5:
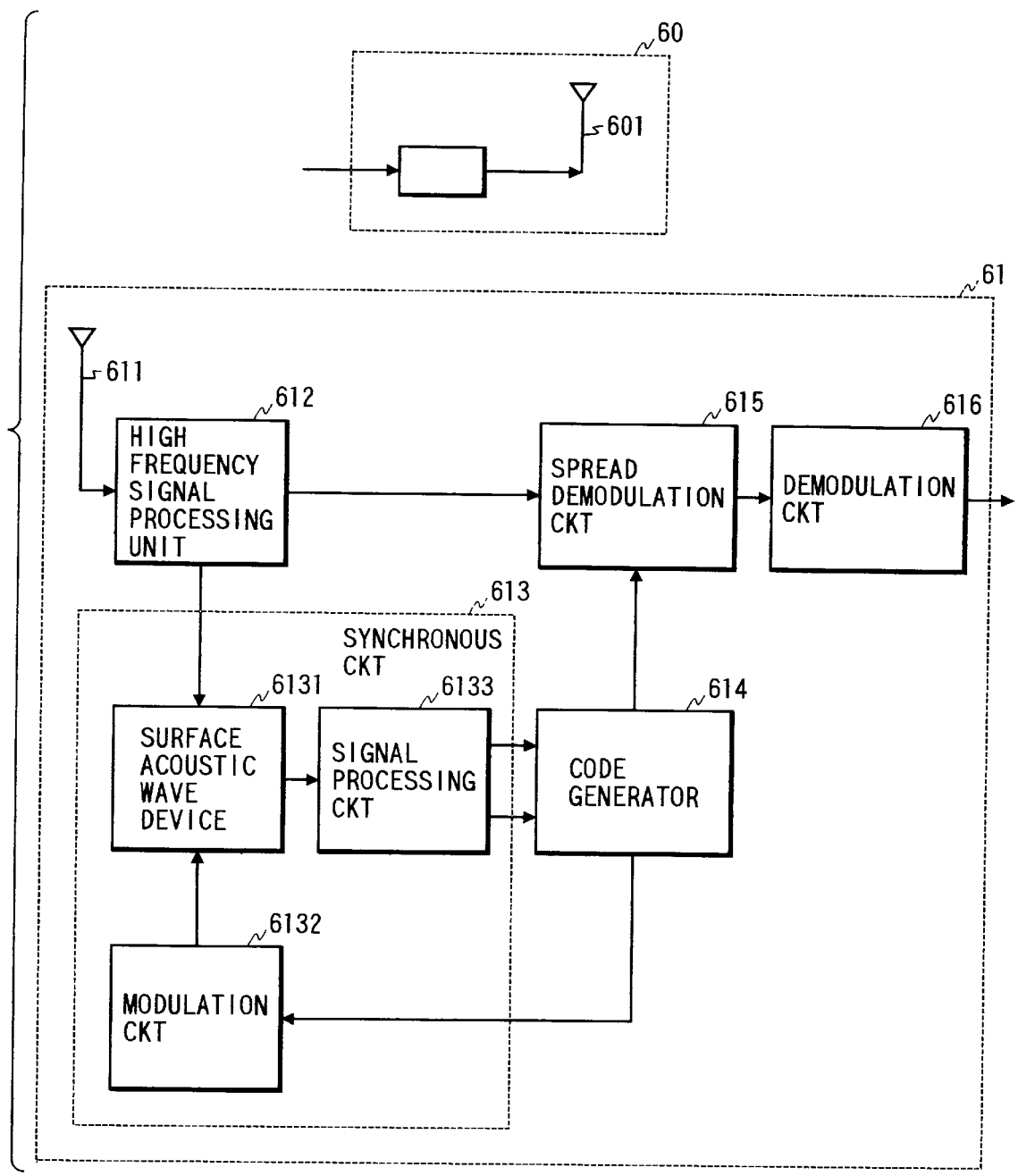
FIG. 5 is a drawing to show an example of setup of the spread spectrum communication system of the present invention.

FIG. 5 is a block diagram to show an example of the spread spectrum communication system using the surface acoustic wave apparatus as explained above. In the drawing, reference numeral 60 designates a transmitter. This transmitter multiplies a signal to be transmitted by a spread code PN to effect spread spectrum modulation in order to widen the transmission band, raise the frequency reuse rate, and increase the system capacity, and transmits the signal through an antenna 601.

The signal transmitted is received by a receiver 61 to be subjected to inverse spread to be demodulated. The receiver 61 is composed of an antenna 611, a high-frequency signal processing unit 612, a synchronous circuit 613, a code generator 614, a spread demodulation circuit 615, and a demodulation circuit 616. In the receiver 61, a receiving signal received through the antenna 611 is subjected to appropriate filtering and amplification in the high-frequency signal processing unit 612 to be output as it is as a signal in the transmission frequency band or to be converted into a signal in an adequate intermediate frequency band to be output. The high-frequency signal, either the signal in the transmission frequency band or the signal in the intermediate frequency band, is input into the synchronous circuit 613.

The synchronous circuit 613 is composed of a surface acoustic wave device 6131, which corresponds to the surface acoustic wave convolver device 10 as described in Embodiments 1 to 3 of the present invention, a modulation circuit 6132 for modulating a reference spread code PN supplied from the code generator 614, and a signal processing circuit 6133 for processing a signal output from the surface acoustic wave device 6131 and outputting a spread code synchronizing signal and a clock synchronizing signal for the transmission signal to the code generator 614. An output signal from the high-frequency signal processing unit 612 and an output signal from the modulation circuit 6132 are input into the surface acoustic wave device 6131, where the convolution arithmetic of the two input signals is carried out. Supposing the reference spread code PN supplied from the code generator 614 to the modulation circuit 6132 is a code obtained by time-inverting the spread code transmitted from the transmitter side, the surface acoustic wave device 6131 outputs a correlation peak when a synchronization-only spread code component from the high-frequency signal processing unit 612 included in the receiving signal and the reference spread code PN from the modulation circuit 6132 become coincident with each other on the waveguide of the surface acoustic wave device 6131.

The signal processing circuit 6133 detects the correlation peak from the signal received from the surface acoustic wave device 6131, and calculates an amount of deviation of code synchronization from a period between code start of the reference spread code PN and output of the correlation peak to output the code synchronizing signal and clock signal to the code generator 614. After establishment of synchronization, the code generator 614 generates the spread code with the clock and spread code phase coincident with those of the transmission-side spread code. This spread code is input into the spread demodulation circuit 615 to restore the signal before the spread modulation. A signal output from the spread demodulation circuit 615 is a signal modulated by a generally used modulation method such as the so-called frequency modulation or phase modulation, and thus, the data is demodulated by the demodulation circuit 616. The high-frequency signal processing unit 612, synchronous circuit 613, and code generator 614 of the present embodiment are integrated in the surface acoustic wave apparatus as described in Embodiments 1 to 3.

[Embodiment 5]

Figure 6:
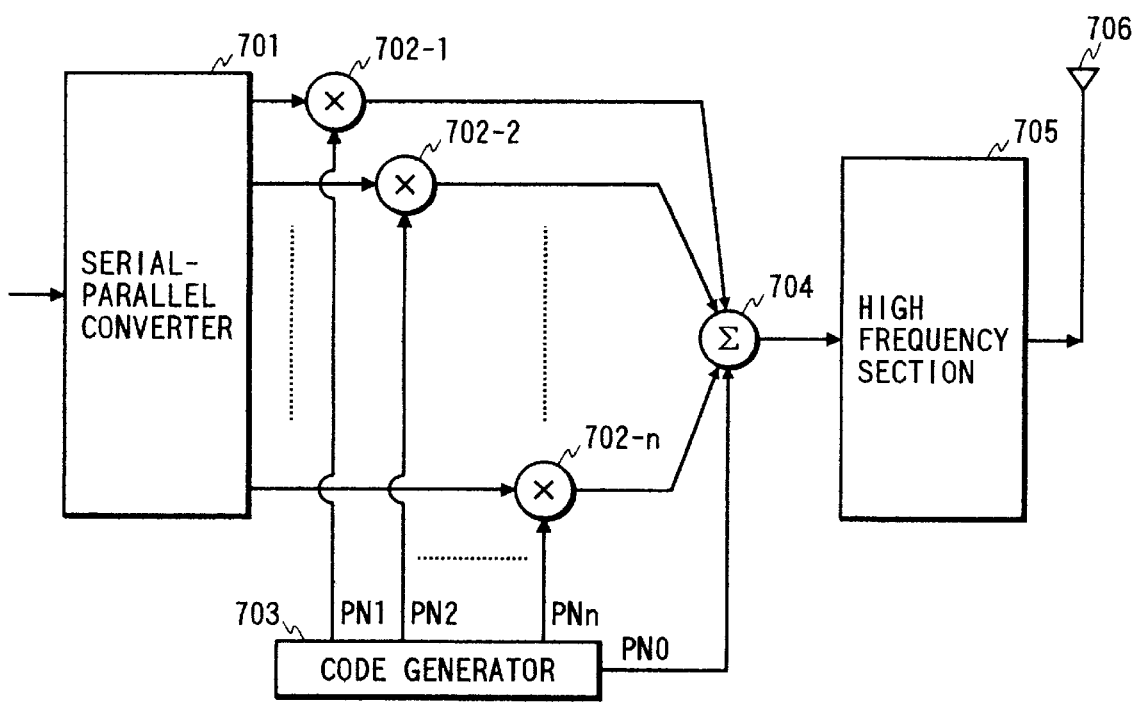
FIG. 6 is a drawing to show an example of setup of a transmitter used in the spread spectrum communication system of the present invention.
Figure 7:
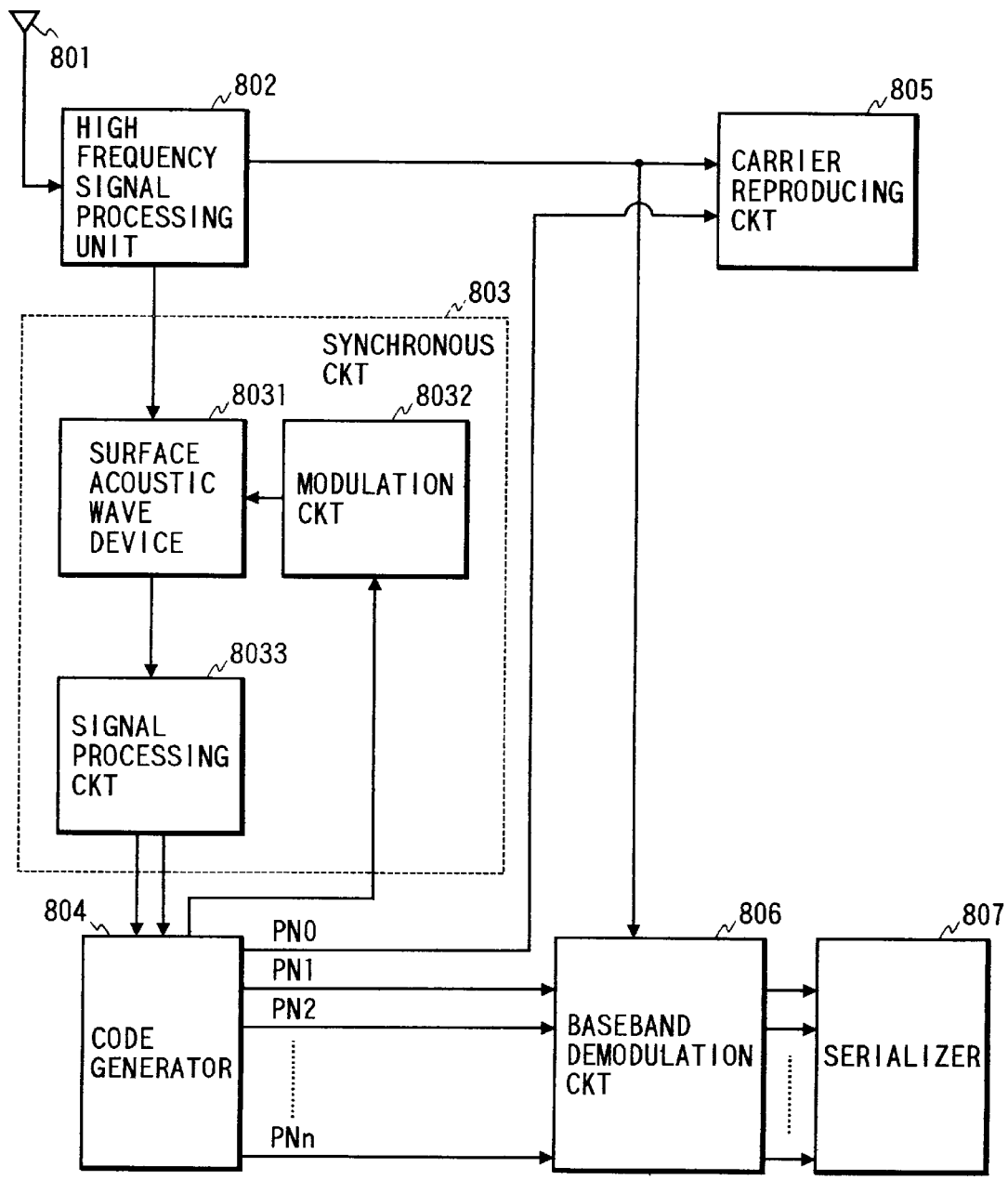
FIG. 7 is a drawing to show an example of setup of a receiver used in the spread spectrum communication system of the present invention.

FIG. 6 and FIG. 7 are block diagrams to show an example of transmitter and receiver in a communication system by spread spectrum using the surface acoustic wave device as explained above. In FIG. 6 showing the block diagram of the transmitter side, numeral 701 designates a serial-parallel converter for converting signal data input in series into n parallel data, 702-1 to 702-n multipliers for multiplying each parallel data by either of n spread codes PN1 to PNn output from a spread code generator, 703 the spread code generator for generating n mutually different spread codes PN and a synchronization-only spread code PN0, 704 an adder for adding n outputs from the multipliers 702-1 to 702-n to the synchronization-only spread code PN0 output from the spread code generator 703, 705 a high-frequency section for converting an output of a spectral wide-band frequency signal from the adder 704 into a transmission frequency signal, and 706 a transmission antenna.

In FIG. 7 showing the block diagram of the receiver side, numeral 801 denotes a receiving antenna, 802 a high-frequency signal processing unit, 803 a synchronous circuit for capturing and maintaining synchronization to the transmission-side spread codes PN and clock, 804 a spread code generator for generating (n+1) spread codes PN1 to PNn and reference spread code PN0, which are the same as the transmission-side spread codes, based on the code synchronizing signal and clock signal supplied from the synchronous circuit 803, 805 a carrier reproducing circuit for reproducing a carrier wave signal from the carrier reproduction spread code PN0 output from the spread code generator 804 and an output from the high-frequency signal processing unit 802, 806 a baseband demodulation circuit for performing demodulation in the baseband, using the output from the carrier reproducing circuit 805, the output from the high-frequency signal processing unit 802, and the outputs from the spread code generator 804, the n spread codes PN1 to PNn, and 807 a serializer for converting the n parallel demodulation data as outputs from the baseband demodulation circuit 806 into serial data.

In the above setup, on the transmission side the serial-parallel converter 701 first converts serial data input thereto into parallel data in the number of n equal to code division multiplicity. On the other hand, the spread code generator 703 generates the (n+1) spread codes PN0 to PNn different from each other at same code periods. Among them PN0 is a reference spread code only for synchronization and carrier reproduction and is directly input into the adder 704 without being modulated with the above parallel data. The n rest spread codes are modulated with the n parallel data in the multipliers 702-1 to 702-n and the thus modulated signals are input into the adder 704. The adder 704 linearly adds the (n+1) signals input thereto to output the baseband signal after addition to the high-frequency section 705. The baseband signal is a signal having a spectrum in a very wide band as a spread spectrum signal, and is then converted into a high-frequency signal having an appropriate center frequency in the high-frequency section 705, which is transmitted through the transmission antenna 706.

On the reception side, the signal received through the receiving antenna 801 is subjected to appropriate filtering and amplification in the high-frequency signal processing unit 802 to be output as it is as a signal in the transmission frequency band or to be converted into a signal in an appropriate intermediate frequency band to be output. The transmission frequency band signal or the intermediate frequency band signal is input into the synchronous circuit 803. The synchronous circuit 803 is composed of a surface acoustic wave device 8031 corresponding to the surface acoustic wave convolver device 10 as described in the embodiments of the present invention, a modulation circuit 8032 for modulating the reference spread code supplied from the code generator 804, and a signal processing circuit 8033 for processing a signal output from the surface acoustic wave device 8031 and outputting the spread code synchronizing signal and clock synchronizing signal for the transmission signal to the spread code generator 804. The surface acoustic wave device 8031 receives the high-frequency output signal of the spread spectrum signal from the high-frequency signal processing unit 802 and the output signal of the reference spread code modulated from the modulation circuit 8032, and performs the convolution arithmetic of the two input signals. A high correlation peak can be obtained from the two signals.

Here, supposing the reference spread code input from the code generator 804 into the modulation circuit 8032 is a code obtained by time-inverting the synchronization-only spread code transmitted from the transmitter side, the surface acoustic wave device 8031 outputs a correlation peak when the synchronization-only spread code component included in the receiving signal and the reference spread code become coincident with each other on the waveguide of the surface acoustic wave device 8031.

The next signal processing circuit 8033 detects the correlation peak from the signal supplied from the surface acoustic wave device 8031 to calculate an amount of deviation of code synchronization from the period between code start of the reference spread code and output of the correlation peak, and the code synchronizing signal and clock signal are output to the spread code generator 804. Spread codes synchronized with the receiving signal can be obtained through stabilization of the loop circuit composed of the synchronous circuit 803 and the code generator 804. After establishment of synchronization, the spread code generator 804 generates the spread codes PN0-PN*n* coincident in clock and spread code phase with the transmission-side spread codes. Out of these codes PN0-PN*n*, the synchronization-only spread code PN0 is input into the carrier reproducing circuit 805.

The carrier reproducing circuit 805 performs inverse spread of the receiving signal in the transmission frequency band or the receiving signal converted into the intermediate frequency band, which is an output from the high-frequency signal processing unit 802, with the synchronization-only spread code PN0 to reproduce a carrier wave in the transmission frequency band or in the intermediate frequency band. A setup of the carrier reproducing circuit 805 applicable is, for example, a circuit utilizing a phase-locked loop.

A multiplier multiplies the receiving signal by the synchronization-only spread code PN0. After establishment of synchronization, the clock and code phase of the synchronization-only spread code in the receiving signal are coincident with those of the synchronization-only spread code for reference, and the transmission-side synchronization-only spread code is not modulated with data. When the transmission-side synchronization-only spread code is inversely spread by the multiplier, a component of the carrier wave appears in the output thereof. The output is then input into a band-pass filter to extract only the component of the carrier wave, and the extracted component is output. The output is input into the phase-locked loop well known, composed of a phase detector, a loop-filter, and a voltage-controlled oscillator, and the voltage-controlled oscillator outputs as a reproduced carrier wave a signal locked in phase to the carrier wave component output from the band-pass filter.

The carrier wave reproduced is input into the baseband demodulation circuit 806. The baseband demodulation circuit 806 generates the baseband signal from the reproduced carrier wave and the output from the high-frequency signal processing unit 802. The baseband signal is distributed into n, which are subjected to inverse spread every code division channel with the spread codes PN1-PN*n* as outputs from the spread code generator 804, and data is then demodulated. The n parallel demodulation data demodulated is then converted into serial data by the serializer 807, and the serial data is output.

The present embodiment was explained as to the case of binary modulation, but the present surface acoustic wave device can also, of course, be used not only for convolution of receiver by the spread spectrum (SS) method, but also for another modulation method such as the orthogonal modulation, if used for convolution. Particularly, since the spread spectrum signal in the wide band is handled by multiplying the input data by the pseudo spread codes, applicability of the convolver performing the convolution arithmetic of surface acoustic waves with flat phase characteristics in the wide band can strongly maintain the reliability of the transmission-reception system.

The carrier reproducing circuit 805, baseband demodulation circuit 806, and serializer 807 are not integrated in the surface acoustic wave apparatus shown in the foregoing embodiments, but these can be integrated as juxtaposed therein.

What is claimed is:

1. A surface acoustic wave apparatus comprising:

a first substrate having a piezo-electric property;

first and second input electrodes, disposed on a first surface of said first substrate, for exciting first and second surface acoustic waves;

an output electrode for exciting a convolution signal of the first and second surface acoustic waves by nonlinear effect;

a second substrate having a recess in which said first substrate is housed; and a strip pattern comprising a conductive film on said second substrate, wherein said strip pattern has plural input terminals respectively connected electrically to plural sections of said output electrode, and a signal output terminal for synthesizing signals from said input terminals to derive the convolution signal, said strip pattern being formulated into plural stages, each stage combining outputs from two prior stages, and times for signals from respective sections of said output electrode to reach said output terminal of said strip pattern are equal.

2. The apparatus according to claim 1, wherein said second substrate comprises a ceramic material.

3. The apparatus according to claim 1, wherein said second substrate comprises a resin material.

4. The apparatus according to claim 1, wherein said first substrate housed within the recess of said second substrate is sealed by a cap formed on the recess.

5. The apparatus according to claim 1, wherein said second substrate comprises a laminated substrate formed by laminating plural layers.

6. The apparatus according to claim 5, wherein a part of said strip pattern comprises an inter-layer connection wiring of said plural layers.

7. The apparatus according to claim 6, wherein said inter-layer connection wiring is disposed in a hole formed in each layer.

8. The apparatus according to claim 1, wherein the plural output terminals of said strip pattern are disposed equally spaced along a longitudinal direction of said output electrode, said input terminals of said strip pattern and the plural sections of said output electrode are mutually connected through wire bonding.

9. The apparatus according to claim 1, wherein said input terminals of said strip pattern are disposed equally spaced along a longitudinal direction of said output electrode, in opposition to said output electrode, said input terminals and the plural sections of said output electrode are mutually connected by face-down bonding using bumps.

10. The apparatus according to claim 1, wherein said second substrate is provided with a convolver peripheral circuit.

11. The apparatus according to claim 10, wherein said convolver peripheral circuit comprises at least one of a convolver input-output matching circuit, a filter and an amplifier.

12. The apparatus according to claim 10, wherein said second substrate is provided with a spread spectrum signal receiving circuit.

13. The apparatus according to claim 12, wherein said spread spectrum signal receiving circuit comprises at least one of an RF signal processing unit, a reference signal generating unit and a convolution output signal processing unit.

14. A receiver for receiving a spread spectrum signal, provided with a surface acoustic wave apparatus according to any one of claims 1–13, wherein said first and second input electrodes input respectively the spread spectrum signal and the reference signal.

15. A spread spectrum communication system for communicating with the spread spectrum signal comprising:

a transmitter for transmitting a spread spectrum signal; and a surface acoustic wave apparatus according to any one of claims 1–13, wherein said first and second input electrodes input respectively the spread spectrum signal and the reference signal.

* * * * *

UNITED STATES PATENT AND TRADEMARK OFFICE
CERTIFICATE OF CORRECTION

PATENT NO. : 5,962,950
DATED : October 5, 1999
INVENTOR(S) : KOICHI EGARA ET AL.

It is certified that error appears in the above-identified patent and that said Letters Patent is hereby corrected as shown below:

AT [56] REFERENCES CITED

Foreign PATENT DOCUMENTS

```
    "5275965              --5-275965
     6053775                6-053775
     6085600                6-085600
     6132770"  should read  6-132770--.
```

AT [56] REFERENCES CITED

ATTORNEY, AGENT, OR FIRM

"Fitzpatrick Cella Harper & Scinto" should read --Fitzpatrick, Cella, Harper & Scinto--.

COLUMN 1

Line 21, "its" should read --their--.

COLUMN 2

Line 3, "the both" should read --both the--; and
Line 53, "element;" should read --element,--.

UNITED STATES PATENT AND TRADEMARK OFFICE
CERTIFICATE OF CORRECTION

PATENT NO.    : 5,962,950

DATED         : October 5, 1999

INVENTOR(S)   : KOICHI EGARA ET AL.

It is certified that error appears in the above-identified patent and that said Letters Patent is hereby corrected as shown below:

<u>COLUMN 7</u>

Line 17, "an approximately" should read --approximately the--.

Signed and Sealed this

Twenty-fifth Day of July, 2000

Q. TODD DICKINSON

*Attest:*

*Attesting Officer*                    *Director of Patents and Trademarks*